US012777065B2

(12) United States Patent
Molloy et al.

(10) Patent No.: US 12,777,065 B2
(45) Date of Patent: *Oct. 27, 2026

(54) DYNAMIC HIERARCHICAL TAGGING SYSTEM AND METHOD

(71) Applicant: Qualys, Inc., Foster City, CA (US)

(72) Inventors: Sean M. Molloy, Parker, CO (US); Terry Ramos, Vacaville, CA (US); Sumedh Shrinand Thakar, San Jose, CA (US)

(73) Assignee: Qualys, Inc., Foster City, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 19/048,552

(22) Filed: Feb. 7, 2025

(65) Prior Publication Data

US 2025/0184348 A1 Jun. 5, 2025

Related U.S. Application Data

(63) Continuation of application No. 18/437,034, filed on Feb. 8, 2024, now Pat. No. 12,250,242, which is a (Continued)

(51) Int. Cl.
*H04L 29/06* (2006.01)
*H04L 9/40* (2022.01)
(Continued)

(52) U.S. Cl.
CPC ....... *H04L 63/1433* (2013.01); *G06Q 10/087* (2013.01); *H04L 67/10* (2013.01)

(58) Field of Classification Search
None
See application file for complete search history.

(56) References Cited

U.S. PATENT DOCUMENTS 6,983,221 B2 1/2006 Tracy et al.
7,178,166 B1 2/2007 Taylor et al.
(Continued)

OTHER PUBLICATIONS

International Search Report and Written Opinion dated May 23, 2012 in connection with International Application No. PCT/US2011/056042, 6 pages.

*Primary Examiner* — Benjamin E Lanier
(74) *Attorney, Agent, or Firm* — Baker & McKenzie LLP

(57) ABSTRACT

A dynamical hierarchical tagging system connected to a user site through a remote communications network. The system may comprise a master controller, a job management server connected to the master controller, one or more scanners in communication with the job management server, wherein the one or more scanners are configured to scan for one or more user assets located at the user site, resulting in scan results, a scan logic processor connected to the master controller, wherein the scan logic processor is configured to store the scan results in a user database, a tagging logic engine connected to the master controller, wherein the tagging logic engine is configured to tag the scan results stored in the user database, and an indexing logic processor connected to the master controller, wherein the indexing logic processor is configured to search and index the tagged scan results stored in the user database.

20 Claims, 6 Drawing Sheets

Related U.S. Application Data continuation of application No. 17/321,185, filed on May 14, 2021, now Pat. No. 11,902,313, which is a continuation of application No. 15/478,096, filed on Apr. 3, 2017, now Pat. No. 11,012,460, which is a continuation of application No. 13/272,189, filed on Oct. 12, 2011, now Pat. No. 9,613,099.

(60) Provisional application No. 61/392,324, filed on Oct. 12, 2010.

(51) Int. Cl.
*G06Q 10/087* (2023.01)
*H04L 67/10* (2022.01)

(56) References Cited

U.S. PATENT DOCUMENTS

| | | | | |
|---|---|---|---|---|
| 7,483,423 | B2 | 1/2009 | Grewal et al. | |
| 7,673,324 | B2 | 3/2010 | Tirosh et al. | |
| 7,921,063 | B1 | 4/2011 | Quinlan | |
| 8,321,437 | B2 | 11/2012 | Lim | |
| 8,584,240 | B1 | 11/2013 | Yang et al. | |
| 11,012,460 | B2 | 5/2021 | Molloy et al. | |
| 11,902,313 | B2 | 2/2024 | Molloy et al. | |
| 12,250,242 | B2 * | 3/2025 | Molloy | G06F 16/907 |
| 2004/0059822 | A1 | 3/2004 | Jiang et al. | |
| 2006/0021021 | A1 | 1/2006 | Patel | |
| 2006/0272011 | A1 | 11/2006 | Ide et al. | |
| 2007/0022315 | A1 | 1/2007 | Comegys, II | |
| 2008/0133486 | A1 | 6/2008 | Fitzgerald et al. | |
| 2008/0235801 | A1 | 9/2008 | Soderberg et al. | |
| 2008/0275851 | A1 | 11/2008 | Taylor et al. | |
| 2009/0049547 | A1 | 2/2009 | Fan | |
| 2009/0210944 | A1 | 8/2009 | Greiner | |
| 2009/0240692 | A1 | 9/2009 | Barton et al. | |
| 2010/0005471 | A1 | 1/2010 | Jethani et al. | |
| 2010/0083346 | A1 | 4/2010 | Forman et al. | |
| 2010/0175134 | A1 | 7/2010 | Ali-Ahmad et al. | |
| 2010/0305990 | A1 | 12/2010 | Tyree et al. | |
| 2011/0125758 | A1 | 5/2011 | Basso et al. | |
| 2011/0214183 | A1 | 9/2011 | Fudge | |
| 2011/0302409 | A1 | 12/2011 | Rao et al. | |
| 2012/0004945 | A1 | 1/2012 | Vaswani | |
| 2012/0102359 | A1 | 4/2012 | Hooks | |

* cited by examiner

DYNAMIC HIERARCHICAL TAGGING SYSTEM AND METHOD

CROSS-REFERENCE TO RELATED APPLICATIONS

This application is a continuation of U.S. application Ser. No. 18/437,034, filed Feb. 8, 2024, which is a continuation of U.S. application Ser. No. 17/321,185, filed May 14, 2021, now U.S. Pat. No. 11,902,313, issued Feb. 13, 2024, which is a continuation of U.S. application Ser. No. 15/478,096, filed Apr. 3, 2017, now U.S. Pat. No. 11,012,460, issued May 18, 2021, which is a continuation of U.S. application Ser. No. 13/272,189, filed Oct. 12, 2011, now U.S. Pat. No. 9,613,099, issued Apr. 4, 2017, which claims priority to U.S. Provisional Application No. 61/392,324, filed Oct. 12, 2010, all of which are hereby incorporated by reference for all purposes.

TECHNICAL FIELD

In a corporate enterprise network, the presently described embodiments relate to organizing and tagging of computer, software, and network assets by a security management system that interfaces with the enterprise network through the internet. The security management system is therefore a cloud-based system that interfaces with managed asset scanners within and/or exterior to the enterprise network. The presently described embodiments provide a dynamic hierarchical tagging system and method that provides advantages over previously known solutions.

BACKGROUND OF THE INVENTION

In a corporate enterprise network, any device connected to a network, such as desktop workstations, tablets, phones, etc., may have attributes that change on a regular basis. These attributes may include IP addresses, patch levels, vulnerabilities, installed software, running services, etc. Network administrators and users may want to organize the network assets into groups based at least in part on these rapidly-changing attributes. The present disclosure provides for a way to create groups that change with the changing attributes.

SUMMARY OF THE INVENTION

In an embodiment, a dynamical hierarchical tagging system connected to a user site through a remote communications network is disclosed. The system may comprise a master controller, a job management server connected to the master controller, one or more scanners in communication with the job management server, wherein the one or more scanners are configured to scan for one or more user assets located at the user site, resulting in scan results, a scan logic processor connected to the master controller, wherein the scan logic processor is configured to store the scan results in a user database, a tagging logic engine connected to the master controller, wherein the tagging logic engine is configured to tag the scan results stored in the user database, and an indexing logic processor connected to the master controller, wherein the indexing logic processor is configured to search and index the tagged scan results stored in the user database. In this system, the scan logic processor may be configured to normalize the scan results stored in the user database to determine which of the normalized scan results need to be updated in a subsequent processing of a scan based on discovered values of the one or more assets previously scanned and the normalized scan results may be related back to the tagged and indexed scan results stored in the user database and are used to track the one or more user assets.

In a further embodiment, a method for tagging one or more user assets located at a user site with a dynamical hierarchical tagging system connected through a remote communications network is disclosed. The method may comprise providing a master controller, connecting a job management server to the master controller, providing one or more scanners in communication with the job management server, wherein the one or more scanners are configured to scan for the one or more user assets located at the user site, resulting in scan results, connecting a scan logic processor to the master controller, wherein the scan logic processor is configured to store the scan results in a user database, connecting a tagging logic engine to the master controller, wherein the tagging logic engine is configured to tag the scan results stored in the user database, and connecting an indexing logic processor to the master controller, wherein the indexing logic processor is configured to search and index the tagged scan results stored in the user database. The method may further comprise that the scan logic processor and the indexing logic processor may be configured to normalize the tagged and indexed scan results stored in the user database to determine which of the scan results need to be updated in a subsequent scan based on discovered values of the one or more assets previously scanned, and further wherein the normalized scan results may be related back to the tagged and indexed scan results stored in the user database and are used to track the one or more user assets.

DETAILED DESCRIPTION

Disclosed herein are various embodiments of a dynamical hierarchical tagging system connected to a user site through a remote communications network. The system may comprise a master controller, a job management server connected to the master controller, one or more scanners in communication with the job management server, wherein the one or more scanners are configured to scan for one or more user assets located at the user site, resulting in scan results, a scan logic processor connected to the master controller, wherein the scan logic processor is configured to store the scan results in a user database, a tagging logic engine connected to the master controller, wherein the tagging logic engine is configured to tag the scan results stored in the user database, and an indexing logic processor connected to the master controller, wherein the indexing logic processor is configured to search and index the tagged scan results stored in the user database.

Figure 1:
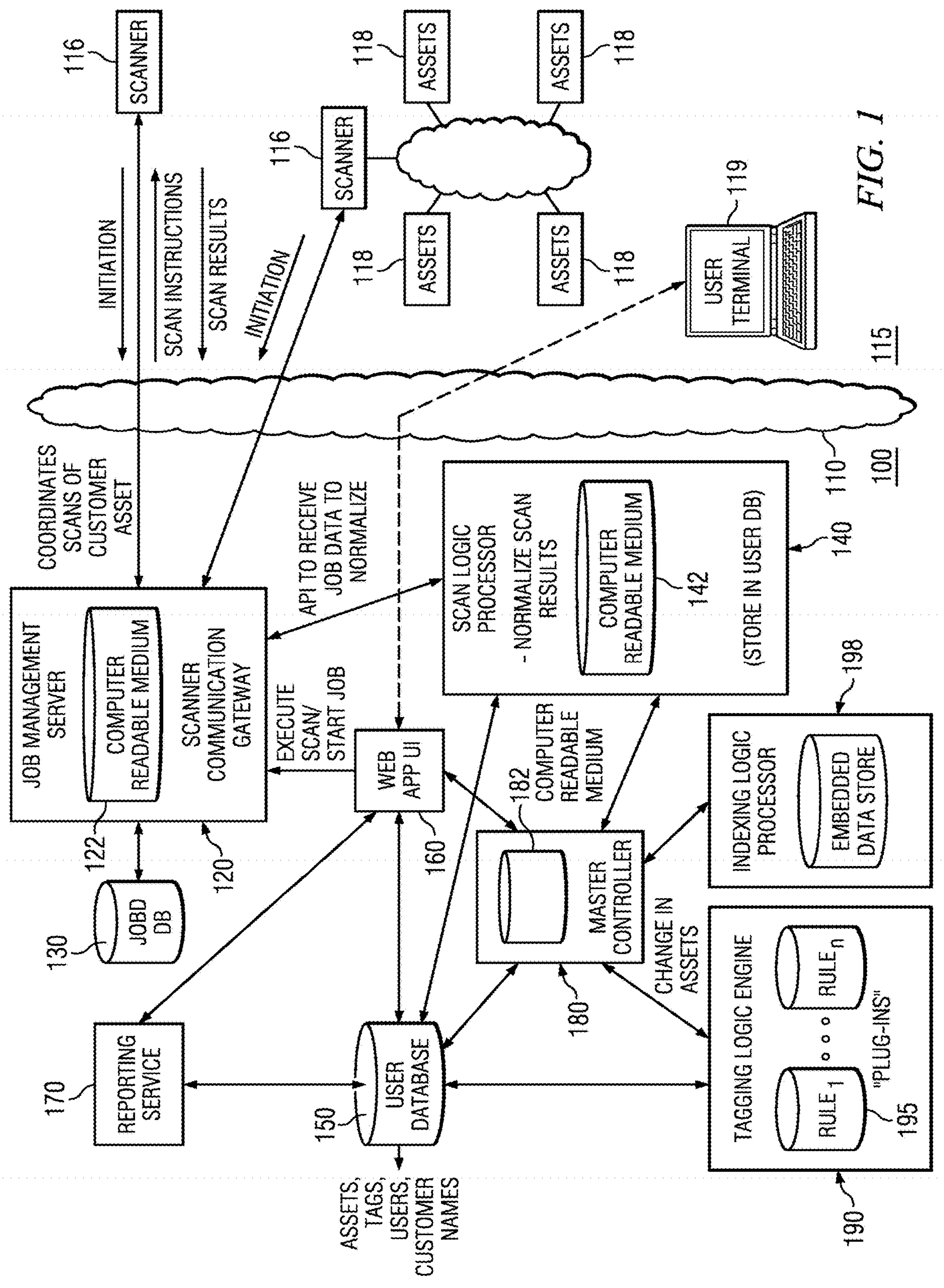
FIG. 1 is a system level diagram of a security management system connected to a customer system through a remote communications network, in accordance with one embodiment of the present disclosure.

According to FIG. 1, a security management system 100 may be connected to a user site 115 through a remote communications network or "cloud" 110. The security management system 100 may comprise one or more scanners 116 and may be located at the user site 115 or exterior to the user site, also connected to the customer site and/or other security management system element through the internet. The scanners 116 may be connected through the remote communications network 110 to a job management server 120 located off-site from the user site 115. The job management server 120 may be configured to coordinate communications with the scanners 116.

The scanners 116 themselves may initiate connections with the job management server 120 to conduct scans of one or more user assets 118, such as desktop computers, laptops, workstations, tablets, phones, etc. The connections may also be initiated at the instruction of the job management server 120. The scans may be stored in a raw format in a job management database 130 connected to the job management server 120. The scans may then be used to create a summary of all of the assets 118 that exist at the user site 115. The security management system 100 may also use the scans to create a computer-generated report as further described in FIGS. 8-12.

Server logic, which is stored on a computer readable medium or memory 122 of the job management server 120 that when read may cause the job management server 120, may execute instructions that may be responsible for coordinating the communication of information between various components in the security management system 100. A scan logic processor 140 may be connected to the job management server 120, and re-tags the scan results individually by accessing the results of the scanning and may receive communications from the job management server 120. The job management server 120 may be configured to realize when it has received updated scan results. The scan logic processor 140 further normalizes the scan results in accordance with instructions stored on computer-readable medium, and the scan logic processor 140 may store those scan results in a user database 150.

Figure 2:
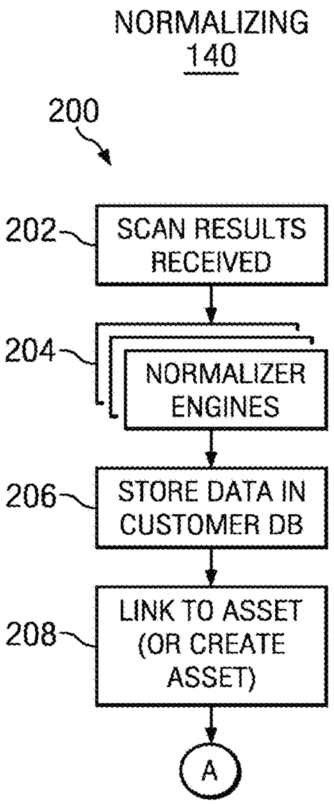
FIG. 2 is a flowchart depicting normalizing asset scan data, in accordance with one embodiment of the present disclosure.

During execution of the above-described "Normalize Scan Results" process in the scan logic processor 140, as discussed in more detail in FIG. 2, the information about which parameters were previously used in executing the scan job through the job management server 120 may be used by the scan logic processor 140. That information may be used to determine which aspects of the data in the user database 150 should be updated based on the discovered value(s) on the user assets 118 that were scanned by one or more of the scanners 116.

For example, on scans initiated with authentication properly enabled, the scans may be able to discover information about assets 118 that previously run, non-authenticated scans would not discover. Because of this, certain values in the user database 150 may be overwritten when normalizing the results of this scan, due to the "more authoritative" nature of the authenticated scan results. By the same token, if a non-authenticated scan is run on the same assets 118 after an authenticated scan, some information about the host in the user database 150 would not be updated, as the newer scan's information would be deemed "less authoritative" due to the prior authenticated scan.

The logic in the scan logic processor 140 determines whether to update the data on an element-by-element basis, as some elements may be better detected with authenticated scans, while others may not. In addition, many other types of scan parameters may be used to influence normalization strategy. Such other parameters include vulnerability signatures such as QIDs, TCP/UDP port limitations, etc. Logic for determining such normalization strategies may all be contained in the scan logic processor 140, and that logic may be executed after a scan is completed at the user site 115 and is transmitted through the remote communications network 110.

The user database 150 may be accessible by the user through a web application user interface ("web app UI") 160, which the user may access through a user terminal 119 at the user site 115. By controlling the user terminal 119 and the user database 150, the user can configure the types of tagging used, can tag assets, can see results of the tagging, and/or run various reports. The reporting activity is indicated on FIG. 1 by the connection between the web app UI 160 and a reporting service 170. The reporting service is able to access the user database 150 in order to access data with which to generate the various computer-generated reports mentioned.

A master controller 180 is used to centrally control the various elements within the system, including the scan logic processor 140, the user database 150, the web app UI 160, a tagging logic engine 190, and an indexing logic processor 198. The master controller 180 interfaces with the job management server 120 through the scan logic processor 140, normalizing job data received from an application programming interface ("API").

The formatted scan results and scanned assets in the user database 150 may be available to the tagging logic engine 190. The tagging logic engine 190 may include a number of plug-ins 195. A plug-in may be defined as a customizable set of logic by which to evaluate a tag's applicability to a specific asset 118. The plug-ins 195 may contain various rules (depicted as $Rule_1$ to $Rule_n$) that may be used to apply tags to the asset records 118 stored in the user database 150. The asset records 118 may have multiple tags and the tags themselves may have associated rules so that a tag definition itself may be used to decide whether the tag should be applied to an asset 118. Different tags may use the same kind of rule, and the logic associated with rules may be defined and loaded in the plug-ins 195.

Tags for operating systems of the various assets may use the same "operating system string matches pattern" rule so they may all use the same plug-in 195. There may be several "operating system" tags that use one rule with a variable applied in a certain way to apply the tags to the various assets 118. The plug-ins 195 provide an open system that can accept new rule definitions as the security management system 100 evolves. For example, in an embodiment, if a user wants to tag an asset 118 based on its IP address, a new IP address plug-in 195 could be added, which could then be used to tag assets based their IP address and physical location.

The tagging logic engine 190 and the indexing logic processor 198 in connection with a computer-readable medium or memory 182 of the master controller 180 use dynamic tagging to allow the security management system 100 to scan and tag quickly and efficiently. The master controller 180 may be a pipeline for different events, so as a scan is being normalized, the scan logic processor 140 may begin triggering events for the tagging logic engine 190 to re-evaluate tagging, and in turn, signal events for indexing. In addition, as a result of what is going on in the user database 150 via other processes, tags may be added to the assets 118 that affect what is visible and what is not visible in the web app UI 160. The tagging logic engine 190 can be used to determine the scope for reporting scans from the scan logic processor 140 and used to determine the scope for future scans by the scanners 116 via the job management server 120.

The set of assets 118 to be scanned in a subsequent may be determined by the user based on a user-defined tag. For example, the user may want to scan all assets that were previously tagged with the "Windows" tag. The "Windows" tag may then be used to look up which assets 118 in the user database 150 have a matching tag of "Windows" and send those "Windows"-tagged assets 118 to the job management server 120 be the targets for the scanners 116 for subsequent scans.

Hierarchally organizing the tags means enables an approach by which if a user would like to report against all Windows servers, the tag "Windows" may be expanded down to all the tags that may be underneath it. For example, if there are many child tags of the "Windows" tag, the user may get all assets with the tag "Windows" or its children by performing a query against the user database 150, which may return a large set of assets 118 that can be hierarchically grouped. These assets 118 may be grouped because the user may chose the single tag "Windows," which may then be expanded to each of the child tags and then expanded to all the assets 118 that have any of those child tags. These tagged assets 118 may then be used as the scope for the report or the scope for the scan job.

FIG. 2 is a flowchart 200 depicting a process for normalizing asset scan data. As shown in the figure, at action 202 scan results are received from the scanner 116 via the job management server 120. After the scan results are received, at action 204, a series of normalizer engines are invoked to process the raw data sent from the one or more scanners 116. After the normalizer engines are invoked, at action 206 the normalized scan results are stored in the user database 150. This data is sent to the user database 150 via the master controller 180 and once stored there can be later used by the tagging logic engine 190 or the indexing logic processor 198. At action 208, the data may be linked to the asset 118 or a new asset 118 may be created, if needed, by the master controller 180, and the master controller 180 may send the data linked to the asset(s) 118 to the tagging logic engine 190, as described in more detail in FIG. 3.

Figure 3:
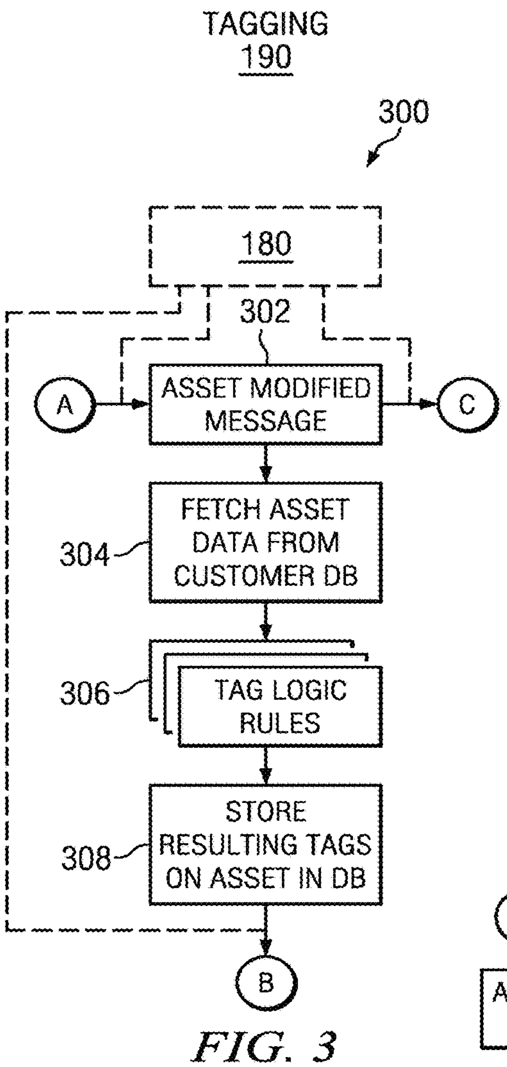
FIG. 3 is a flowchart depicting tagging assets, in accordance with one embodiment of the present disclosure.

Referring now to FIG. 3, a flowchart 300 depicting a process of tagging assets is shown, in accordance with one embodiment of the present disclosure. The tagging process was described in some detail in FIG. 1 in connection with the tagging logic engine 190. The tagging logic engine 190 may receive data linked to the asset(s) 118, as described in FIG. 2 and shown by the label "A."

Still referring to FIG. 3, at action 302, after data is linked to the asset 118 and received at label "A," an "asset modified" message may be sent by the master controller 180 and received by the tagging logic engine 190. At action 304, once the data has been successfully stored in the user database 150, the "asset modified" message is received and processed. At action 306 a signal event may be sent to the tagging logic engine 190. The tagging logic engine 190 then locates the new information and invokes plug-in rules 195 upon that information from the user database 150. At action 308 the tagging logic engine 190 may communicate directly with the user database 150 and the resulting set of tags on the assets 118 may be stored in the user database 150. The stored tags may then be sent to the indexing logic processor 198, as described in more detail in FIG. 4.

Figure 4:
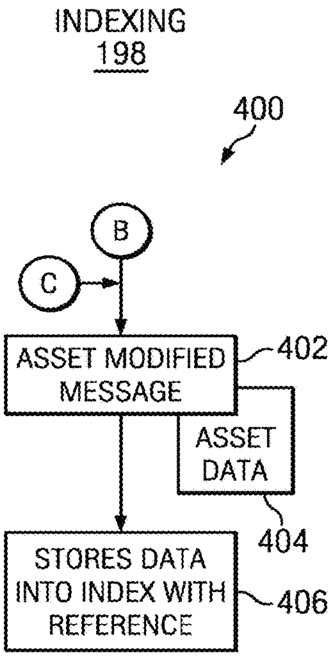
FIG. 4 is a flowchart depicting indexing assets, in accordance with one embodiment of the present disclosure.

Referring now to FIG. 4, a flowchart 400 depicting a process of indexing assets is shown, in accordance with one embodiment of the present disclosure. The indexing process was described in some detail in FIG. 1 in connection with the indexing logic processor 198. In this embodiment, the indexing logic processor 198 receives data from the user database 150 via the master controller 180, as shown in FIG. 3 and depicted by the labeled inputs "B" and "C."

Still referring to FIG. 4, at action 402, the indexing logic processor 198 may receive the asset modified message from FIG. 3 from the master controller 180, as depicted by the labeled inputs "B" and "C." At action 404, the indexing logic processor 198 may receive the asset tags data from FIG. 3 from the master controller 180. At action 406, the indexing logic processor 198 stores the asset modified message and the asset tags with references, which may later be searched the by the indexing logic processor 198. When the embedded data store of the indexing logic processor 198 is later searched, it is operable to return according to specified criteria. The indexing logic processor 198 may be invoked twice because the same asset modification message may be generated again when the tags are stored or changed.

Figure 5:
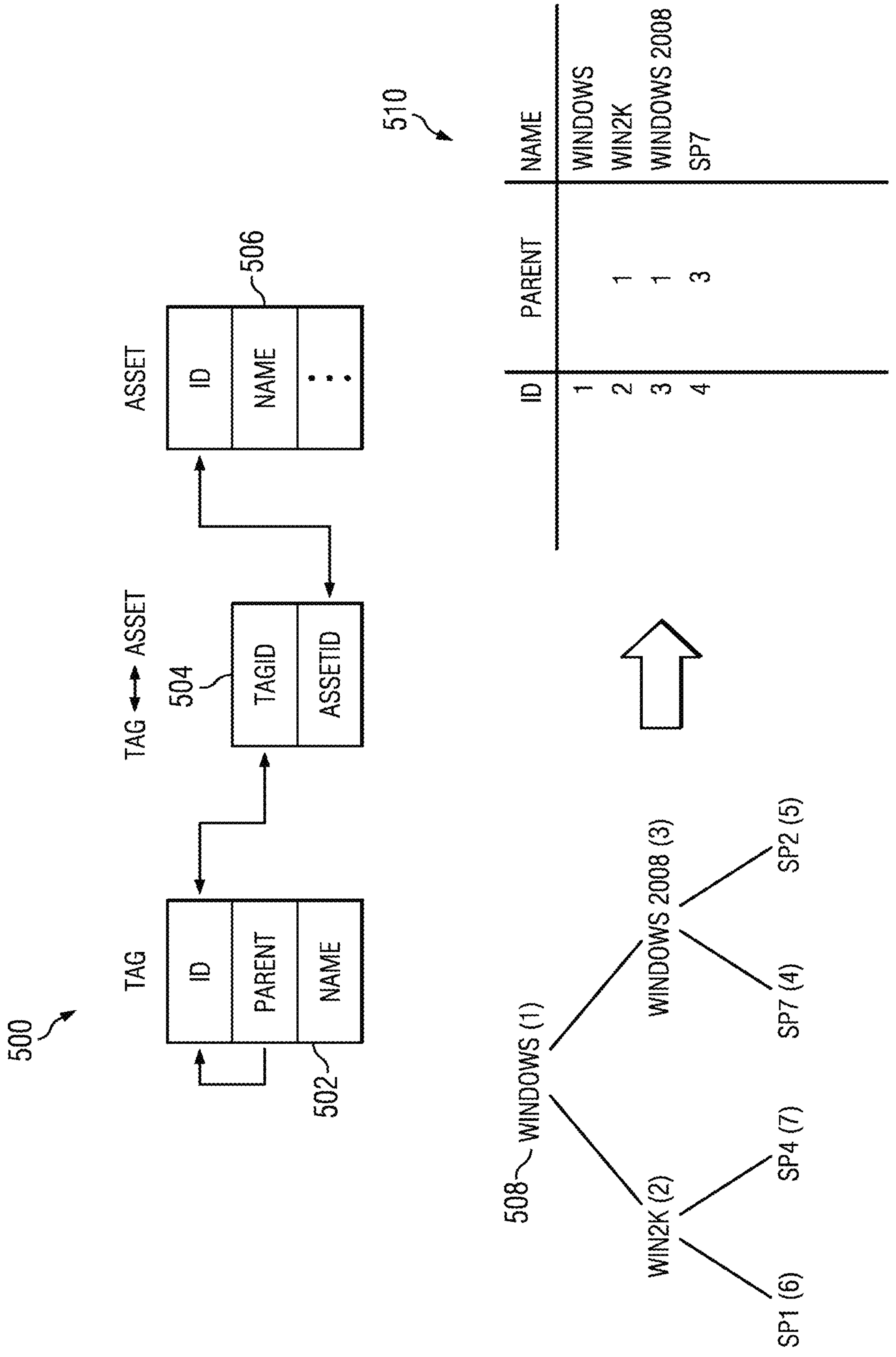
FIG. 5 is a tag-to-asset relationship structure, in accordance with one embodiment of the present disclosure.

Referring now to FIG. 5, an exemplary tag-to-asset relationship structure 500 is shown. In the illustrated tag-to-asset relationship structure 500, a tag table 502 may comprise ID, parent, and name fields. The illustrated asset table 506 comprises ID and name fields, and as indicate, it contains other types of information. As shown at 504, the asset ID may link to ASSETID and the tag ID may link to TAGID. The parent field may link to the ID field for tag 502, creating a self-referencing tag table. Assets may have multiple tags and tags may have multiple assets, so this relationship may create a self-referencing tree out of the assets, as shown in a tree 508.

In the illustrated tree 508, every tag has an ID. For example, referring to the tree 508, there can be tags for Windows ("ID1"), Windows 2000 ("ID2"), Windows 2008 ("ID3"), service pack 7 ("ID4"), service pack 5 ("ID5"), service pack 1 ("ID6"), and service pack 4 ("ID7"). In this instance, ID1 Windows is the root of the tree. ID2 Windows 2000's parent is ID1 Windows, ID3 Windows2008's parent is ID1 Windows, ID4 service pack 7's parents are ID3 Windows 2008 and ID1 Windows, as shown in a flat two-dimensional table of the tree 508, which is well known in computer science.

The tree 508 can also be shown in a table 510, with columns representing the ID, Parent, and Name fields, for example. Looking at ID4, in this example the figures shows that its parent is ID3 and its name is "service pack 7." Further in this example, ID3's parent is ID1 and its name is "Windows 2008" and ID1 does not have a parent and its name is "Windows." An asset can have many tags, to it can be a many-to-many asset, as shown in the illustrated tree 508. If a node in the tree 508 is chosen, it can be expanded out to all of its children to create a list 510 of the asset IDs, parents, and names. Then, if a second node in the tree 508 is chosen, it can also be expanded out to all of its children to create a second list 510, and the two lists 510 may be compared to search for intersections. Intersections between assets may allow a user to advantageously use the tree 508 over and over to narrow down the set of assets to be compared, resulting in computational efficiencies within the security management system 100.

Figure 6:
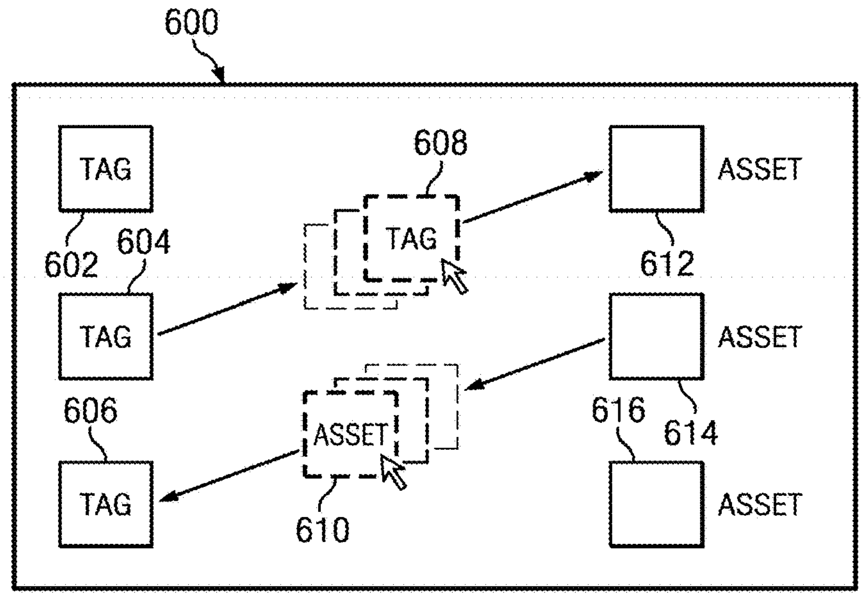
FIG. 6 is a tag-to-asset relationship, in accordance with one embodiment of the present disclosure.

Referring now to FIG. 6, a tag-to-asset relationship 600 is shown in accordance with an embodiment of the present disclosure. In the tag-to-asset relationship 600, tags 602, 604, and 606 are shown, along with assets 612, 614, and 616. In a user interface corresponding to this structure, the tag-to-asset relationship may be shown by a dotted tag 608, where tag 604 may be moved to asset 612 either by a drag-and-drop method, a check-a-box-with-a-button method, or any other user interface ("UI") implementation. Likewise, in the present embodiment, the asset-to-tag relationship is shown by a dotted asset 610, where asset 614 is moved to tag 606 either by a drag-and-drop method, a check-a-box-with-a-button method, or any other UI implementation.

Figure 7:
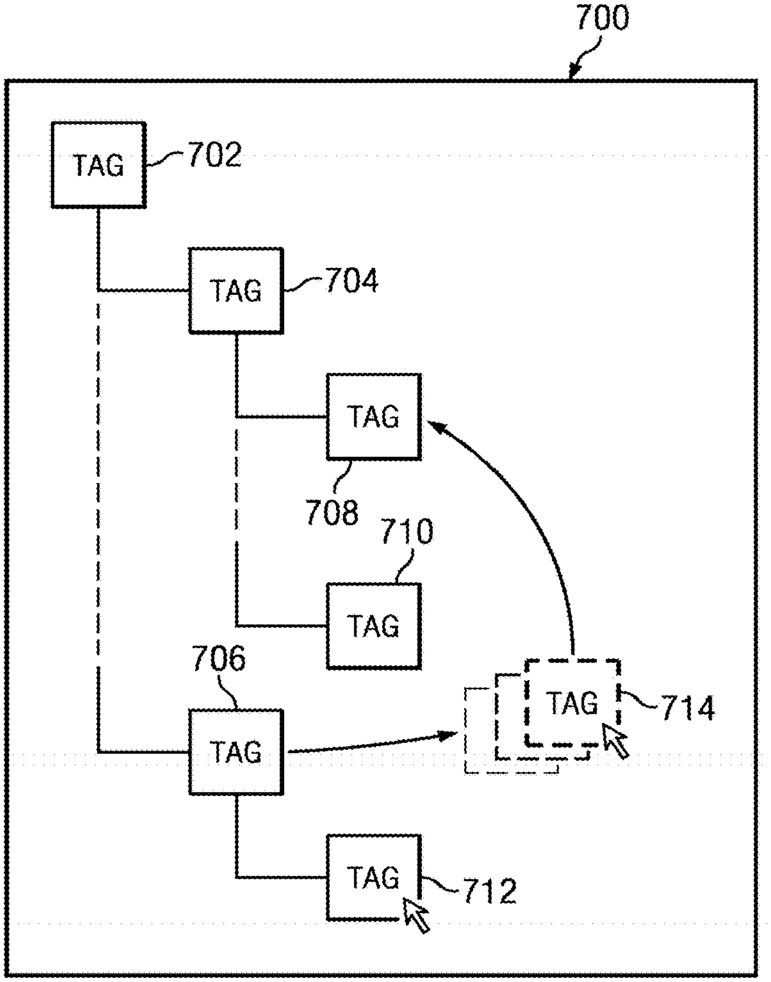
FIG. 7 is a tag tree organization, in accordance with one embodiment of the present disclosure.

Referring now to FIG. 7, a tag tree organization 700 is shown in accordance with an embodiment of the present disclosure. In the illustrated tag tree organization 700, tag 702 is a parent tag with child tags 704, 706. Tag 704 may have child tags 708, 710. Tag 706 may have a child tag 712, and tag 706 and its child 712 may be moved to be a child and grand-child of tag 708 by dragging-and-dropping tag 706 onto tag 708, as shown by dotted tag 714. The hierarchical natures by which a user can organize the tags creates a one-parent, many-child relationship. The tag history may be made available so that a specific tag may be assigned to certain assets or may be altered by a user. In addition, more details about the tag, such as its name, type, the logic rule used to assign it, the parameters for that logic rule, among others, may be available through many different UI interactive models, such as a context-menu, a dialog, or a hover.

Figure 8:
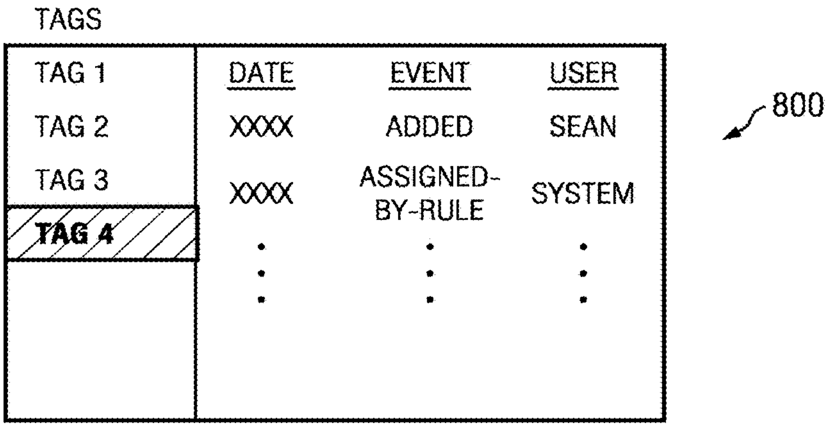
FIG. 8 is a screen shot of a tag's history, in accordance with one embodiment of the present disclosure.

Referring now to FIG. 8, a screen shot 800 of a tag's history is shown, in accordance with an embodiment of the present disclosure. In the illustrated screen shot 800, one or more tags are shown in a left-hand column, and when a particular tag is selected its tag history may be detailed in a right-hand column. The tag history may be made available so that when a tag is assigned to a specific asset or tag, there may be a global audit log of that tag's specific history. In the screen shot 800 shown, when "Tag 4" is selected, the right-hand column shows that "Sean" added the tag on date "xx/xx" and then the system assigned the tag by a rule on date "xx/xx."

Figure 9:
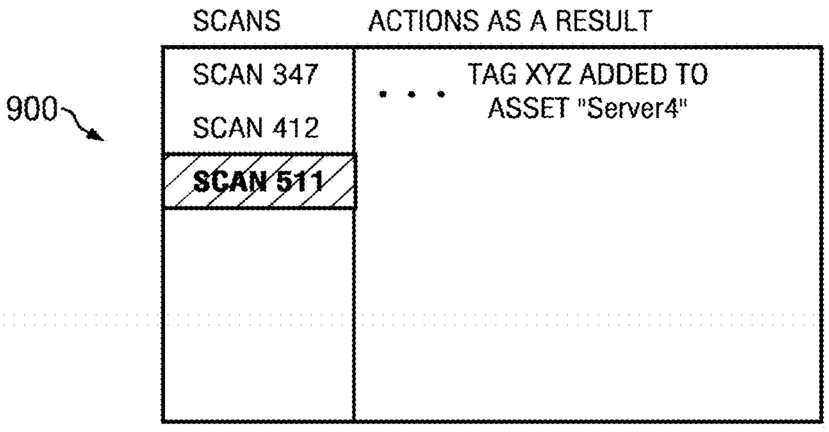
FIG. 9 is a screen shot of scan-to-tag results, in accordance with one embodiment of the present disclosure.

Referring now to FIG. 9, a screen shot 900 of scan-to-tag results is shown in accordance with an embodiment of the present disclosure. The illustrated screen shot 900 shows one or more scans in a left-hand column, and when a particular scan is selected the user can learn what actions occurred as a result of the information gathered from that particular scan in a right-hand column. A scan may then be traced to determine if it was run against a series of devices so that the results of the scan can tracked to the tags' asset organization. In the screen shot shown, when "Scan 511" is selected, the right-hand column shows that tag "XYZ" was added to the asset "Server4."

Figure 10:
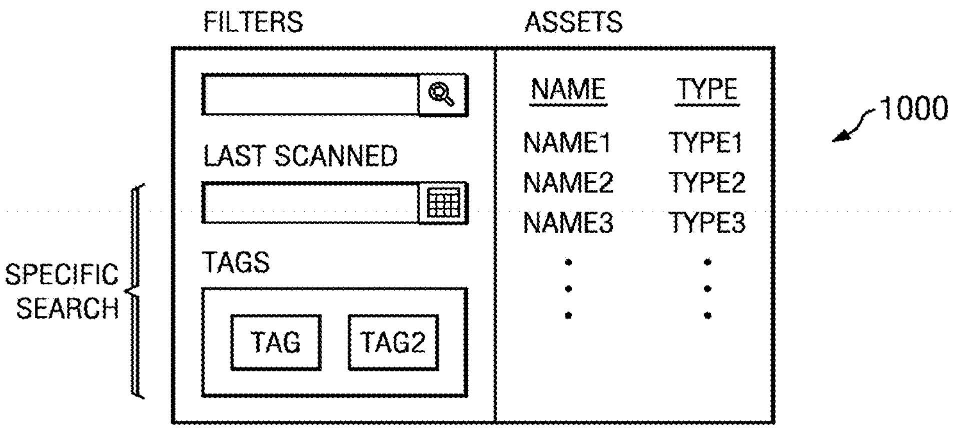
FIG. 10 is a screen shot of tag-to-asset and scan-by-tag, in accordance with one embodiment of the present disclosure.

Referring now to FIG. 10, a screen shot 1000 of tag-to-asset and scan-by-tag is shown in accordance with an embodiment of the present disclosure. The illustrated screen shot 1000 shows one or more specific search filters in a left-hand column that may be used to target scans or report bulk actions resulting in a list of assets in a right-hand column. By organizing assets, a user may be able to create reports on the assets, see intersections between tags, or target scans by tags. The results of a scan may populate data by asset, and that data may then be used to assign tags based on certain rules. In the illustrated screen shot shown, specific filters such as a text search box field, a "Last Scanned" with a date range filed, or a "Tags" search box may be used to return specific assets, each with a name and type of asset (NAME1 and TYPE1, etc.), among many other features, listed. This result may then be used as targeting for a subsequent scan, report, or any kind of bulk action. Filters may be used to find multiple assets and to report on them and scan them on certain days. The results may change as tagging is dynamic, and as a result, the list of assets returned by the query may change on that certain day each week.

Advantageously, this may limit the starting point of each subsequent scan on that certain day of the week so that the entire set of assets may not have to be scanned each week. For example, many companies require employees to manage the lists of assets scanned each Monday. The tags may dynamically keep track of all of the information about the assets, and then the tags may be used as search criteria so that the scan target may only have to scan each asset with a certain tag, even if the IP address of the tag may later change.

Figure 11:
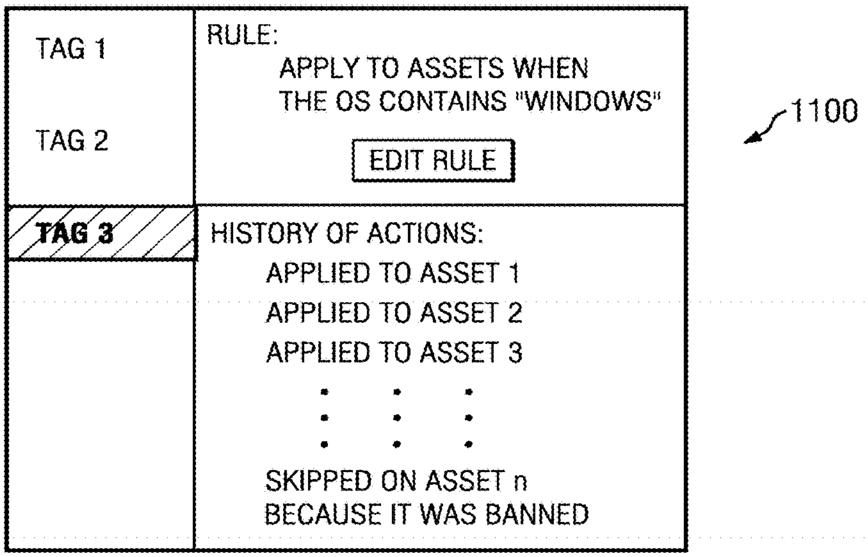
FIG. 11 is a screen shot of rule engine auditing and rule setup, in accordance with one embodiment of the present disclosure.

Referring now to FIG. 11, a screen shot 1100 of rule engine auditing and rule setup is shown in accordance with an embodiment of the present disclosure. In the security management system 100, a user may apply tags to assets or the system may apply tags to assets. When the user applies a tag to an asset, the tagging logic engine 190 will not remove it. However, when the user removes a tag to an asset that the tagging logic engine 190 applied, a ban may optionally be created, preventing the tagging logic engine 190 from adding that tag back to the assets 118 in the future. The tagging logic engine 190 may log the time each time the user bans a tag that the tagging logic engine 190 wants to apply. These logs may be stored in the user database 150 and are available through the web app UI 160. A user may care about two functionalities: first, given a rule, what is the rule doing; and second, if a new rule is composed and enacted, where does the rule apply. The interface is shown in the screen shot 1100.

In the illustrated screen shot 1100, a left-hand column lists tags while a right-hand column lists rules and a history of actions. For example, when "Tag 3" is selected, the rule may state "Apply to assets when the OS contains 'Windows.'" The history of the actions may show that this rule was applied to asset 1, asset 2 and so on, but was skipped on asset "n" because it was banned by the user. The user may have the option of editing the rule for "Tag 3" when it is selected. The tag asset rule may be edited by double-clicking on the asset, and the audit tag history may be viewed by a single left click or right click on the asset.

Each rule may have a dedicated interface to edit it with. Simple rules may include whether an asset is running the Windows OS. Other rules may be more complex and may include yes/no settings, drop down settings, or text fields.

Each tag rule may have a different screen in the web app UI 160, and how the user chooses to configure the settings in that screen may determine how the tag functions in their particular environment. A user may create a tag rule that is based on the vulnerability tag engine. The same tag rule may be used by two different users with slightly different configurations, and therefore, may appear as different assets in each case.

Figure 12:
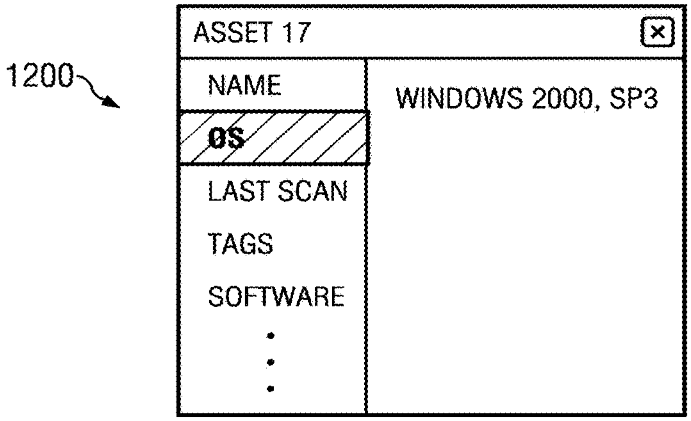
FIG. 12 is a screen shot of asset details and attributes, in accordance with one embodiment of the present disclosure.

Referring now to FIG. 12, a screen shot 1200 of asset details and attributes is shown in accordance with an embodiment of the present disclosure. When an asset is opened, the illustrated screen shot 1200 shows at a high level a name value pair list that may include the asset's name, OS, last scan, tags, software, among other attributes, allowing the user to access all information for a specific asset in the user database 150. In the example in screen shot 1200, the asset is "Asset 17" and the user may select the Name, OS, Last Scan, Tags, Software, etc for "Asset 17." When "OS" is selected for "Asset 17," it shows that the OS is Windows 2000 Service Pack 3. If the user selects tags, the user will then see all of the tags associated with asset 17.

Figure 13:
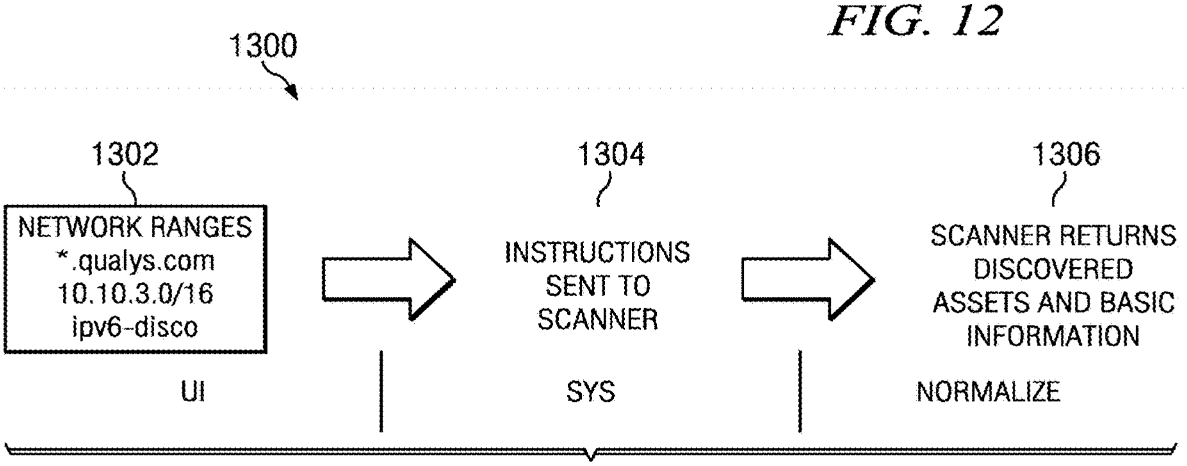
FIG. 13 is a flowchart for the process of asset discovery, in accordance with one embodiment of the present disclosure.

Referring now to FIG. 13, a flowchart for the process of asset discovery 1300 is shown in accordance with an embodiment of the present disclosure. Often, a user will know that they have a particular device in a certain location, but will not realize which assets they might have at the current time. Because tags are the basis for organization, some tags may be associated with a range of network addresses. The illustrated process 1300 may allow the scanner 116 to go into a discovery mode where it can scan for tag windows that relate to the network range. In response, the user may want to instruct the scanner 116 to find all of the devices that it can, but in order to do this, the management security system 100 may need to create an instruction that can be passed down hierarchally that gives the scanner 116 certain instructions.

In the illustrated process 1300, at action 1302 the management security system 100 tells the scanner 116 the known range of IP addresses at a particular location and instructs the scanner 116 to find those addresses. In the example shown, the scanner 116 may search for IP network ranges comprising "*.qualys.com 10.10.3.0/16 ipv6-disco." This action may occur at the web app UI 160. At action 1304, instructions are sent to the scanner 116. This action may occur at the management security system 100 level. At action 1306, the scanner 116 may return the discovered assets 118 and basic information to be normalized by the scan logic processor 140.

For example, if a user does not realize which assets they may have, but know they have a scanner 116 in a particular office in Redwood City, California, the user may instruct the scanner 116 to find every asset 118 that it can. The security management system 100 may then create an instruction in the job management server 120 via the web app UI 160 to tell the scanner 116 the known range of IP addresses in the Redwood City office and to find assets 118 within that IP range.

Discovery scans may be conducted at a regular basis to discover which assets 118 are located in the network based on IP ranges. The scanners 116 may be configured to scan all of the networks within a certain IP range on a given day each week, for example every Monday. These discovery scans may collect enough information to put the asset 118 in the user database 150 and assign it a few simple tags. The discovery scans may be running in the background scanning the user's IP space. The scans that may be conducting vulnerability testing and other more complex, time-consuming scans may be targeted at specific tags. The scanner 116 may then be instructed to look at a specific list of assets 118 that have been queried in the user database 150 for a particular tag, creating a more targeted, specific scan, which results in a more efficient scan.

Referring now back to FIG. 1, one of the advantages of the security management system 100 is that given the very hard network boundary between the user site 115 and the a security management system 100, the scanner infrastructure 116 may be able to collect the data that is required for the scanning and tagging processes. Because the information that needs to be evaluated for which tag should be applied rests inside the asset 118 on the user site 115, it may only be accessible by the scanner 116. Accordingly, the first step in the described embodiments is to get that information from the scanners 116 to the security management system 100 so that it can be processed by the job management server 120. Once the data is scanned, it may be tagged and organized so that it can become searchable. The scan logic processor 140 normalizes the results from job management server 120 so that the tagging logic engine 190 may interpret the data.

The interpretation phase may take this data that may consist of many named value pairs, lists of values, list of numbers, and interpret that data using plug-in rules 195 to determine which tags should be applied to the assets for organizational purposes. Once the interpretation phase is complete, the next step may involve indexing by the indexing logic processor 198. The indexing logic processor 198 may provide a fast and efficient method for searching tags. The indexing logic processor 198 can quickly identify all of the assets that have a particular tag, have more than one particular tags, or have a particular tags plus additional information that was not interpreted into a tag. For example, if the user wants to search for the "Windows" tag, a "Human Resources" tag, and a name which must contain the string "S," then there are three different evaluations, all of which may be combined by the indexing logic processor 198 to return a set of asset IDs which may then be used to either generate a report or start an additional scan.

While all of the information may be scanned, it is possible that some of the data collected by the scanners 116 from the assets 118 and stored by job management server 120 in the job management database 130 may be unimportant to the tagging logic engine 190 because it is information that the user does not care to use it in a particular instance. For example, the data may contain a certain set of registry keys that are irrelevant to the minimum password length required for a user to log into the asset 118 on the user site 115 and there may not be any tag rules that concern this particular value. And so while the data may be stored both in the job management database 130 in its un-normalized form and in the user database 150 in its normalized form, in a particular embodiment this information may not be interpreted by the tagging engine 190 because no rules would be developed for those particular data points. However, the user could always create a new rule if s/he wanted, and that rule could be evaluated after the initial scan time without additional scans. Any data that is stored may be readily available to the tagging logic engine 190 without requiring additional scans, improving the efficiency of the security management system 100.

In a second embodiment, a method is provided for tagging and assignment of access levels whereby system resources, users, and applications all have tags and those tags all have the same structure. Because a given user may have any number of associated assets in a system, and because of how the user interacts at their user terminal 119 with the web app UI 160 and the remote communications network 110, access controls may be built into the system 100. The primary scope of the control may relate to access to the assets 118 themselves. More simply, one user may be responsible for a certain set of assets at the user site 115, while another user may be responsible for a different set of assets at the same user site 115. Identifying the direct user-to-asset relationship may be extremely time consuming if you were to have to relate the user directly to all of their associated scanned assets. A level of aggregation may be required and that aggregation ideally would be dynamic because this set of assets 118 may actually be a very dynamic environment. For example, as servers are provisioned, decommissioned, turned on or off, or perhaps re-commissioned in other roles in an organization, the asset 118 may need to be accessible and managed by several users in the application.

In order to make management somewhat automatic, the security management system 100 can use the tags assigned by the tagging logic engine 190 to provide a level of aggregation. The tagging logic engine's 190 job may be to look in and evaluate visible rules in order to apply and/or remove tags on assets 118 as they are scanned. The tagging logic engine 190 may stay busy on a regular basis keeping these tags up-to-date.

For example, an Administrator User may use the security management system 100 to make User 1 responsible for all Windows servers by creating a relationship between User 1 and the tag "Windows," and the tagging logic engine 190 may keep the tag "Windows" on the correct assets 118 on a regular basis. As new Windows servers appear and old servers disappear, the tagging logic engine 190 may keep the tag "Windows" on the correct assets 118. The security management system 100 may not need to understand anything about what it means to have access to the "Windows" tag—the security management system 100 may know that anything tagged with "Windows" may be accessible by User 1. This can be accomplished with the same intersecting powers as the reports and job targeting so that, for example, User 1 may only have access to assets tagged with "Windows" and "Human Resources," which may reduce the scope of the assets that User 1 can modify and disconnects the requirement for the "Windows" tag and "Human Resources" tag to be managed together on a regular basis.

For example, the "Windows" tag may be easily applied to servers based on the operating system discovered on the server by the scanner 116. On a regular basis, and without user or administrator involvement, the "Human Resources" tag in this example could be applied to assets based on their IP addresses, which may be discovered by the scanner 116 and passed through the security management system 100 and finally normalized by the scan logic processor 140 and stored in the user database 150. The data may then be interpreted by tagging logic engine 190 and the user may then specify that all assets in a certain sub-net must be tagged with the tag "Human Resources" tag. When tags are automatically applied to the assets 118 via the tagging logic engine 190, it may be more predictable, reliable and less susceptible to human error because instead of allowing an administrator or a user to assign these tags, tags may be applied based on the stored rules.

The hierarchy of the tags may make it such that the scope of a user's permissions are hierarchical as well, because giving the user the scope of the "Windows" tag may give the user access to all Windows servers. Should the "Windows" tag have child tags, it would give the user access to any asset tagged with those child tags. The hierarchy, which is not necessarily always evaluated but simply exists as a data structure, can be quickly queried to determine what assets 118 may be in the scope of the "Windows" tag's sub-tree. By creating hierarchy, it may become easier to administrate tags that map to a business and its organization. As a result, there may be hundreds of tags that are all "siblings" for the various versions and types of computer operating systems (i.e., Window 95, Windows 98, Windows 2000, etc.) and these separate tags may all be combined under one tag called "Windows." The user may be granted access to all of these "Windows versions" tags by creating only one relationship. Throughout this process, scanners 116 may be discovering and searching assets 118 for pieces of information and applying the specific "Windows versions" tags to the Assets.

Assets themselves are not the only things that can be tagged in the presently described embodiment. As the security management system 100 can be very large, there may be lots of pieces of information within it. Some examples include: vulnerability ID search lists, option profiles, credential lists, etc., which may all require a human to tag them. Using the tag relationships, the security management system 100 may operate under some specific rules wherein the user is granted access to a tag and the tag is related the secured object. The relationship of a user to a set of tags implies that all data objects in the security management system 100 that have tags which are either in the user's set of tags, or are children of a tag in the user's set of tags, are thusly within the user's "scope" of accessible objects.

The users coming in through user terminal 119, whether at the user site 115 or elsewhere, may use the web app UI 160 to affect the tags stored in the user database 150. This happens asynchronously from the evaluation of the tag logic to apply or remove tags to objects as scans or other system data is being modified. The web app UI 160 may also allow the user to control the rules that the tagging logic engine 190 is following so that the appropriately permissioned user can come in through the user terminal 119 using web app UI 160 and modify the rules stored in user database 150 that the tagging logic engine 190 is reading and using to apply the tags.

The logic framework for the rules of the plug-ins 195 may be written in code by programmers. The variables that the plug-in 195 reads, for example, the operating system regular expression, may specify that the operating system must match the given expression and that expression may be given by the user as a variable to the rule. That variable may be stored in the user database 150 related to that particular user so that when the user creates a particular plug-in rule 195, the user may fill in details controlling the evaluation of the rule. The user may be allowed to fill in one or more key values that complete a rule. In simpler terms, the logic may be written by programmers, while the user fills in a few words to create the functional plug-in rule 195.

In a third embodiment, a method is disclosed herein for auditing and then assigning, monitoring, reporting on, or fixing specific machine vulnerabilities based on operating system tags. Part of the data in the user database 150 that was fetched by the scanner 116 and transferred to job management server 120 may be the state of the vulnerabilities of the assets 118 in the user site 115. This may allow the security management system 100 to know if there is a particular vulnerability on each and every asset 118 that can then be used to tag and create a score that may be reported against. For example, the user may request that the system "locate all of the assets that are tagged with 'Windows' that also contain a particular vulnerability detection." A detected vulnerability, for example, may be a buffer overflow attack which we identify uniquely with a "QID." The first thing that the security management system 100 may do is to take the tag and query for the assets 118 that are tagged with that particular tag ID and compare that list against the user database 150 to find all of the assets that also contain that particular vulnerability. Then, the tag and the vulnerability may create an intersection that can be returned to the user as a list of found assets.

All of the vulnerabilities that can be detected may have an ID. A particular vulnerability detection on a specific host may consist of many different pieces of information about the asset 118. Once the security management system 100 processes and stores these particular pieces of information, it can determine whether the asset is vulnerable (or potentially vulnerable) to an attack. If so, that vulnerability may be assigned an ID. A library of these possible vulnerabilities may be maintained, which may contain entries such as "Buffer overflow attack against windows file sharing service." The scanner 116 may be able to detect these IDs to determine the vulnerability state for particular assets 118. Among the many data points and elements that the scanner 116 sends back as a result of a scan, it may send a list of vulnerabilities detected. In certain instances, a user may choose to tag assets based on whether the asset 118 has, or does not have, a detected vulnerability with a specific ID.

This embodiment may create an intersection between the ID information that is already gathered and stored and the tagging information which is new information that gathered by the tagging logic engine 190. Instead of using the tags as an additional filtering parameter, they may be used as a grouping parameter, providing a quick count of assets in particular groups and also exhibiting certain attributes or vulnerabilities.

For example, assume that a user has a very keen interest in attaching an ID on all of their credit card processing machines or any machine involved in credit card processing. This user has created a series of plug-in rules 195 in the tagging logic engine 190 that may uniquely identify all of the assets 118 at the user site 115 that are involved in credit card processing. So the plug-in rule 195 being evaluated by the tagging logic engine 190 may visibly attach a tag called "credit card processing" on several assets 118. The user may also want to know which, if any, of all their credit card processing assets includes routers and servers and different operating systems that may have a particular set of IDs. This set of information was not previously available until the tagging logic engine 190 was introduced because predecessors could not easily and uniquely identify the credit card processing assets 118 from any of the other assets 118.

In a fourth embodiment, a method is disclosed herein for applying the tagging logic engine 190 to automatically assign tags. The tagging logic engine 190 may contain a series of plug-in rules 195 that are designed to be an ever increasing set containing two aspects: one is the basic logic that they follow, and two is the variables that are set by the user. This series of plug-in rules 195 may be written by programmers and contain a particular sentence or logic structure. For example, the user can say, "name contains [x]" or it could be a very complex something like, "past vulnerabilities contain vulnerabilities of [variable 1, 2, 3, 4, 5] and assets scanned within [date range]." The sentence structure and available variables may be set by the programmer creating the plug-in 195, while the values of the variables may be modifiable by the end-user.

Once the programmers have written several rules that they think will be useful to end users, the user may then be free to take those rules and fill in the variables and use them to apply tags automatically. Several of these rules may have been pre-populated for the users. For example, operating system rules may come pre-populated. But in other cases, the tagging logic engine 190 and plug-in rules 195 may be available for the user to use. For example, the user may say, "I would like to make a new tag based on an IP address rule, and I want to assign the tag 'HR asset' to anything in the 10.10.10/255 network." The programmers may have written a rule that lets the user do the network check against an IP address so that the user only has to fill in the IP address of "10.10.10/255." The tagging logic engine 190 may be evaluating IP addresses and applying the 'HR asset' tag to the assets automatically all the time in the background.

For things that cannot be easily determined programmatically by the computers, a user may assign tags to assets manually. For example, a particular asset 118 that recently had a hard drive replacement or recent hardware change is something that a human would tag because it may be difficult to write a tagging rule 195 to determine those events. There may be several use cases for the idea that IT administrators should tag assets that they are working on so those assets can be more closely scrutinized over the next couple of months to assure that the changes made to those assets did not incur additional vulnerabilities. This may be a case where an IT administrator would their user terminal 119 and web app UI 160 to manually tag "recently modified" to the assets that they worked on that week. The scans that may already be run on a regular weekly basis can be targeted as "all tags recently modified" so that those assets can be more closely scrutinized at a later time.

In a fifth embodiment, a method is disclosed herein for the meshing and merging of tag hierarchies applied to report generation. As discussed earlier, the data structure behind the tags may be hierarchical such that one tag has a parent and a parent tag can have multiple children. This is single parent hierarchy, creating basically a tree. Because of this tree hierarchy and the idea that users are allowed to map intersections, there also needs to be a tree hierarchical intersection. For example, if the user would like to run a report on all assets tagged with both "Windows" and "HR," this would require a tree intersection because when evaluating several child tags and an entire hierarchy below them, there could be a lot of different tags underneath the "HR" tag. By being hierarchical, the security management system 100 may give the user the ability to create the situation where the security management system 100 may map an intersection between the two tags in order to accurately determine what assets would be in scope if you chose to run a report against the "Windows" tag plus the "HR" tag. This may be done by saying, "first expand all the 'Windows' children, then expand all the 'HR' children." Given these two sets of tags, with the user wanting to find all assets that contain at least one tag from set A and at least one tag from set B, an intersection can be computed. Once the system evaluates and locates the assets tagged with these tags, it may enable reports to be made against small subsets of the enterprise's assets 118.

Some pre-computed intersections may be stored for the purpose of applying security in a timely fashion. For example, in the case of the security aspect, if one user comes into user terminal 119 to use the web app UI 160, the web app UI 160 may need to be very responsive. As a result, in cases where assets have to be listed out or shown, the query may need to respond in a very short amount of time. Evaluating this tree intersection is something that may be computationally intensive, so the security management system 100 may pre-compute these intersections so they may be quickly accessed at a later time. One of the pre-computed intersections may be related to security, if, for example, an administrator had previously configured a particular user to be allowed access to all assets tagged with both 'Windows' and 'HR' tags. That intersection may be pre-computed so that the security subsystem may compute and store this set of values on a regular basis. When the user accesses the web app UI 160, a pre-computed intersection of all of the assets IDs that the user could have access to already exists in the user database 150 and may be easily accessible. This may create yet another set of tables that may be updated by triggers within the user database 150 that may be watching for changes to the tag relationships in order to modify the pre-computed intersections as quickly as possible.

This may be basically the same premise as in the third discussed embodiment, discussed above, where a user may use all of the tag aggregations to target a scan for particular vulnerabilities. For example, in the "recently scanned machines" example that was discussed above, the user may want to use all the output of the tagging logic engine 190 that is stored in the user database 150 to create a list of targets to send to the job management server 120 to scan, because when the scanners 116 are scanning the assets 118 in the user site 115, they may be given a list of targets to scan. The scanners 116 may not have to target every asset 118 that they encounter, which may allow the security management system 100 to create a target list based on the scan output from a previous scan that was interpreted by the tagging logic engine 190. On the other hand, if the targets were not previously interpreted by the tagging logic engine 190, there may not be an option to limit the scan targets by tags, and the scanners 116 may have to target every asset 118. Once a scan is completed and some information is discovered about the assets 118, that information may be used to then determine what to scan in the future, and this process may keep repeating itself.

In a sixth embodiment, a method is disclosed herein for coalescing technical and nontechnical assets 118 into a single hierarchy. In this embodiment, users and departments may be manually configured in the user database 150 so that intersections can be run between those allowing for reports based on particular users and departments. Particular users may have security access based on the idea that all of the tags may have the same hierarchical structure for both technical and nontechnical assets 118 that are stored in the table along with all the other technical assets 118. So in the user database 150 there may be one table that is called "Assets" and this table may contain both technical and nontechnical assets 118 so that a department may be a row just like a server may be a row. This means that the nontechnical assets may get all of the same tagging powers and abilities as the technical assets. While it is probably not relevant to say that a department has an IP address, it is relevant to say a department has an attribute like what city is it in. Because of this, a user may create a tag rule that says if the attribute "city" contains the string "Denver," then to tag this asset with "Colorado," for example. The same dynamic tagging powers can be used against nontechnical assets 118 by reading different attributes. These attributes may be set almost entirely through the user terminal 119 and the web app UI 160, as opposed to the technical assets, which get most of their attributes through data scans, through the scanners 116, and through the job management server 120 structure.

There are some attributes of an asset 118 that could be set manually on the nontechnical assets 118, whereas that same attribute could be set automatically from the information that the scanners bring back from technical assets 118. For example, if the tagging logic engine 190 is trying to tag things that are in Colorado, it can do that by IP address for the technical assets 118, but it can do it simply by the city name for the nontechnical assets 118.

An aspect of each of the embodiments discussed above is the scalability that comes from processing in parallel as opposed to processing in a serial way. This basic theory of being able to break up the functions in order to process in mass and parallel so that the asynchronicity is a part of the concept as well as the scalability in order to divide up the workload amongst different operating elements and perhaps operating on different servers. The tag evaluation engine may need to be able to work on each Asset, be it a technical asset like a machine, or a non-technical asset like a department, without knowledge of the other Assets in the system, or a limited knowledge of a small subset of the other Assets, in order to be horizontally scalable.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, as referred to herein, a machine may be a virtual machine, computer, node, instance, host, or machine in a networked computing environment. Also as referred to herein, a networked computing environment is a collection of machines connected by communication channels that facilitate communications between machines and allow for machines to share resources. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

While HTTP communication protocols may be described herein, the coverage of the present application and any patents issuing there from may extend to other local-area network, wide-area network, or other network operating using other communications protocols.

Services and applications are described in this application using those alternative terms. Services can be java services or other instances of operating code. A service/application is a program running on a machine or a cluster of machines in a networked computing environment. Services may be transportable and may be run on multiple machines and/or migrated from one machine to another.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A computing apparatus comprising:

at least one memory comprising instructions; and at least one processing device configured for executing the instructions that, when executed, cause the at least one processing device to perform operations of:

receiving raw scan data in response to conducting a first scan associated with an enterprise network, wherein the enterprise network is in communication with a plurality of assets;

determining whether the first scan associated with the enterprise network is a first authenticated scan or a first non-authenticated scan;

determining whether a second scan associated with the enterprise network was a second authenticated scan or a second non-authenticated scan, wherein the second scan was executed before the first scan;

determining first scan parametric data of the first scan associated with the enterprise network;

determining second scan parametric data of the second scan associated with the enterprise network;

comparing the first scan parametric data of the first scan associated with the enterprise network with the second scan parametric data of the second scan associated with the enterprise network;

modifying the raw scan data, based on comparing the first scan parametric data of the first scan associated with the enterprise network with the second scan parametric data of the second scan associated with the enterprise network, thereby generating modified scan data;

determining, based on the modified scan data, a tag applies to an asset comprised in the plurality of assets, wherein the tag is assigned to the asset in the at least one memory; and generating a target list of assets to be scanned in a subsequent scan associated with the enterprise network, wherein the target list of assets is a subset of the plurality of assets, wherein the computing apparatus is at least partially controlled using a web application.

2. The computing apparatus of claim 1, wherein the computing apparatus is comprised in a cloud server.

3. The computing apparatus of claim 1, wherein the instructions, when executed, further cause the at least one processing device to perform the operation of:

detecting a vulnerability or weakness associated with the asset based on analyzing at least one of the raw scan data and the modified scan data.

4. The computing apparatus of claim 1, wherein the evaluating the modified scan data comprises using a plug-in, and wherein the plug-in comprises at least partially customizable rules for determining whether the tag applies to the asset based on evaluating the modified scan data.

5. The computing apparatus of claim 1, wherein at least one asset in the target list of assets is associated with the tag in the at least one memory.

6. The computing apparatus of claim 1, wherein at least one asset in the target list of assets is scanned during the subsequent scan associated with the enterprise network to determine whether the tag applies to the at least one asset in the target list of assets.

7. The computing apparatus of claim 1, wherein the modifying the raw scan data comprises at least one of:

overwriting the raw scan data, modifying the raw scan data based on whether the first scan associated with the enterprise network is the second authenticated scan or the second non-authenticated scan, or modifying the raw scan data based on whether the second scan associated with the enterprise network was the first authenticated scan or the first non-authenticated scan.

8. A non-transitory computer readable medium comprising code, wherein the code, when executed by at least one processing device of a computing apparatus, causes the at least one processing device to perform the operations of:

receiving raw scan data in response to conducting a first scan associated with an enterprise network, wherein the enterprise network is in communication with a plurality of assets;

determining whether the first scan associated with the enterprise network is a first authenticated scan or a first non-authenticated scan;

determining whether a second scan associated with the enterprise network was a second authenticated scan or a second non-authenticated scan, wherein the second scan was executed before the first scan;

determining first scan parametric data of the first scan associated with the enterprise network;

determining second scan parametric data of the second scan associated with the enterprise network;

comparing the first scan parametric data of the first scan associated with the enterprise network with the second scan parametric data of the second scan associated with the enterprise network;

modifying the raw scan data, based on comparing the first scan parametric data of the first scan associated with the enterprise network with the second scan parametric data of the second scan associated with the enterprise network, thereby generating modified scan data;

determining, based on the modified scan data, a tag applies to an asset comprised in the plurality of assets; and assigning the tag to the asset in at least one memory.

9. The non-transitory computer readable medium of claim 8, wherein the computing apparatus is comprised in a cloud server.

10. The non-transitory computer readable medium of claim 8, wherein the computing apparatus is at least partially controlled using a web application.

11. The non-transitory computer readable medium of claim 8, wherein the code, when executed, further causes the at least one processing device to perform the operation of:

detecting a vulnerability associated with the asset based on analyzing at least one of the raw scan data and the modified scan data.

12. The non-transitory computer readable medium of claim 8, wherein the evaluating the modified scan data comprises using a plug-in, and wherein the plug-in comprises at least partially customizable rules for determining whether the tag applies to the asset based on evaluating the modified scan data.

13. The non-transitory computer readable medium of claim 8, wherein at least one asset in a target list of assets is associated with the tag in the at least one memory.

14. A method comprising:

receiving, by at least one processing device of a computing apparatus, raw scan data in response to conducting a first scan associated with an enterprise network, wherein the enterprise network is in communication with a plurality of assets;

determining, by the at least one processing device, whether the first scan associated with the enterprise network is a first authenticated scan or a first non-authenticated scan;

determining, by the at least one processing device, whether a second scan associated with the enterprise network was a second authenticated scan or a second non-authenticated scan, wherein the second scan was executed before the first scan;

determining first scan parametric data of the first scan associated with the enterprise network;

determining second scan parametric data of the second scan associated with the enterprise network;

comparing the first scan parametric data of the first scan associated with the enterprise network with the second scan parametric data of the second scan associated with the enterprise network;

determining whether to modify the raw scan data, based on comparing the first scan parametric data of the first scan associated with the enterprise network with the second scan parametric data of the second scan associated with the enterprise network, thereby generating modified scan data;

determining, by the at least one processing device, based on the raw scan data or the modified scan data, a tag applies to an asset comprised in the plurality of assets; and assigning, by the at least one processing device, the tag to the asset in at least one memory of the computing apparatus.

15. The method of claim 14, wherein the computing apparatus is comprised in a cloud server.

16. The method of claim 14, wherein the computing apparatus is at least partially controlled using a web application.

17. The method of claim 14, further comprising:

detecting, by the at least one processing device, a vulnerability associated with the asset based on analyzing at least one of the raw scan data and the modified scan data.

18. The method of claim 14, wherein the evaluating the raw scan data comprises using a plug-in, and wherein the plug-in comprises at least partially customizable rules for determining whether the tag applies to the asset based on evaluating the raw scan data.

19. The method of claim 14, wherein at least one asset in a target list of assets is associated with the tag in the at least one memory.

20. The computing apparatus of claim 1, wherein the instructions, when executed, further cause the at least one processing device to perform the operation of: identifying the plurality of assets in communication with the enterprise network using the raw scan data.

* * * * *